United States Patent
Rice et al.

(10) Patent No.: US 8,764,066 B1
(45) Date of Patent: Jul. 1, 2014

(54) EXPANSION COUPLING SYSTEM

(71) Applicants: Tyler S. Rice, Clearwter, FL (US); Sean F. Stockhausen, Clearwater, FL (US)

(72) Inventors: Tyler S. Rice, Clearwter, FL (US); Sean F. Stockhausen, Clearwater, FL (US)

( * ) Notice: Subject to any disclaimer, the term of this patent is extended or adjusted under 35 U.S.C. 154(b) by 0 days.

(21) Appl. No.: 13/623,983

(22) Filed: Sep. 21, 2012

(51) Int. Cl.
*F16L 27/12* (2006.01)

(52) U.S. Cl.
USPC .............................. 285/302; 285/15; 285/340

(58) Field of Classification Search
USPC ............................. 285/302, 298, 224, 340, 15
See application file for complete search history.

(56) References Cited

U.S. PATENT DOCUMENTS

| | | | |
|---|---|---|---|
| 3,399,548 A * | 9/1968 | Burns | 285/302 |
| 3,783,178 A * | 1/1974 | Philibert et al. | 285/302 |
| 3,885,821 A * | 5/1975 | Philibert | 285/302 |
| 4,072,328 A * | 2/1978 | Elliott | 285/302 |
| 4,386,796 A * | 6/1983 | Lyall et al. | 285/302 |
| 4,687,232 A * | 8/1987 | Zimmerman | 285/302 |
| 4,693,316 A * | 9/1987 | Ringgenberg et al. | 285/302 |
| 4,715,624 A * | 12/1987 | Frye | 285/302 |
| 4,776,617 A * | 10/1988 | Sato | 285/302 |
| 4,932,686 A * | 6/1990 | Anderson, Jr. | 285/302 |
| 5,024,469 A * | 6/1991 | Aitken et al. | 285/302 |
| 5,052,721 A * | 10/1991 | Gorman, Jr. | 285/302 |
| 5,160,174 A * | 11/1992 | Thompson | 285/302 |
| 5,624,139 A * | 4/1997 | Van Kooten | 285/302 |
| 5,975,587 A * | 11/1999 | Wood et al. | 285/15 |
| 6,056,329 A * | 5/2000 | Kitani et al. | 285/302 |
| 6,059,321 A * | 5/2000 | Lyall, III | 285/302 |
| 6,286,556 B1 * | 9/2001 | Kato | 285/302 |
| 6,299,217 B1 * | 10/2001 | Saito et al. | 285/302 |
| 6,305,722 B1 * | 10/2001 | Vieregge | 285/298 |
| 6,945,512 B2 * | 9/2005 | Carpenter | 285/133.11 |
| 7,025,392 B2 * | 4/2006 | Inoue et al. | 285/302 |
| 7,111,873 B1 * | 9/2006 | Coogle | 285/302 |
| 7,550,669 B2 * | 6/2009 | Rizzuto, Jr. | 285/302 |
| 8,215,678 B2 * | 7/2012 | Peachey | 285/302 |
| 8,246,082 B2 * | 8/2012 | Stewart et al. | 285/302 |
| 8,313,607 B2 * | 11/2012 | Quinn | 285/238 |
| 8,360,477 B2 * | 1/2013 | Flynn | 285/302 |
| 8,388,026 B2 * | 3/2013 | Spears | 285/15 |
| 8,430,339 B2 * | 4/2013 | Stewart et al. | 285/302 |
| 2007/0176411 A1 * | 8/2007 | Bryan | 285/15 |

* cited by examiner

*Primary Examiner* — David E Bochna

(57) ABSTRACT

A first component has a major section and a coaxial minor section. The major section has an open forward end. A forward annular projection extends radially inwardly from the major section adjacent to the open forward end. A second component has a major section and a coaxial minor section. The major section has an open rearward end. A rearward annular projection extends radially outwardly from the major section adjacent to the open rearward end. Axially spaced annular recesses are provided in the rearward annular projection with an O-ring in each annular recess. The O-rings are slidably received and in sliding contact with the major section of the first component.

2 Claims, 5 Drawing Sheets

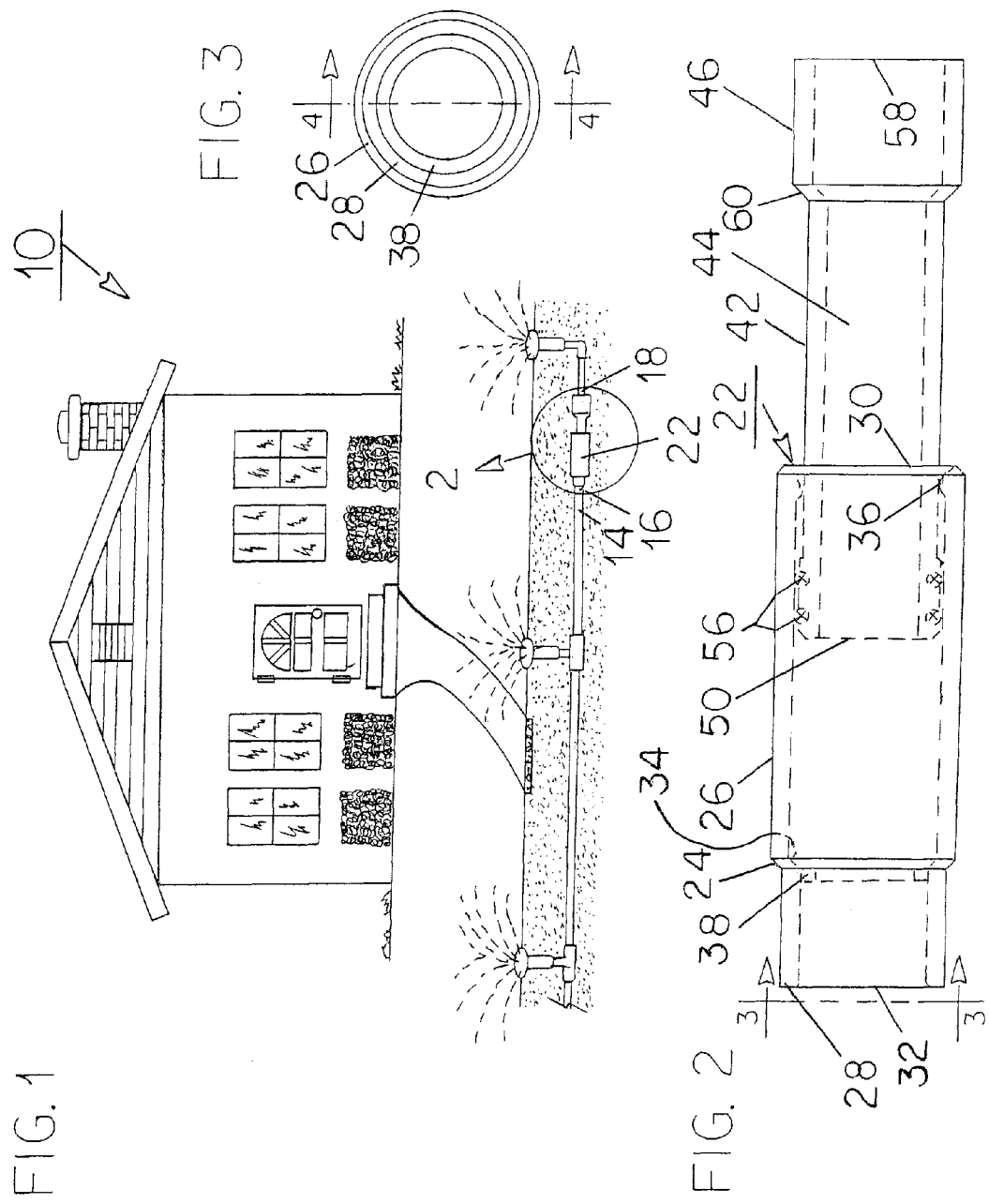

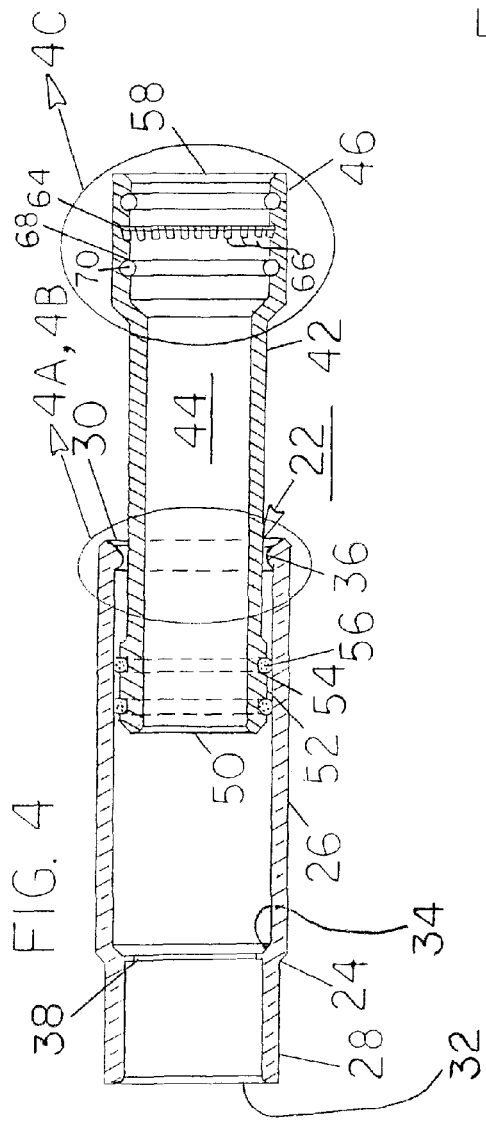
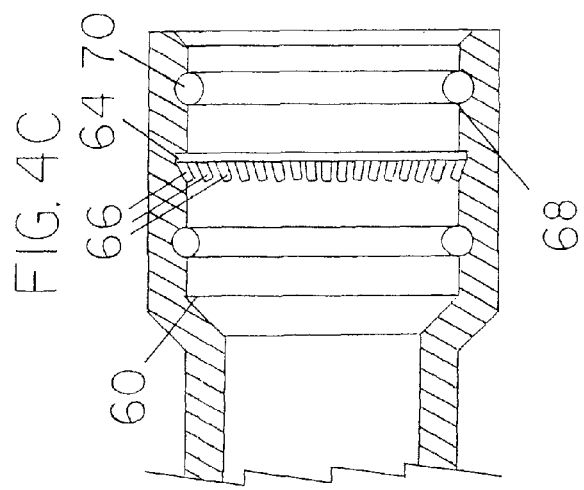
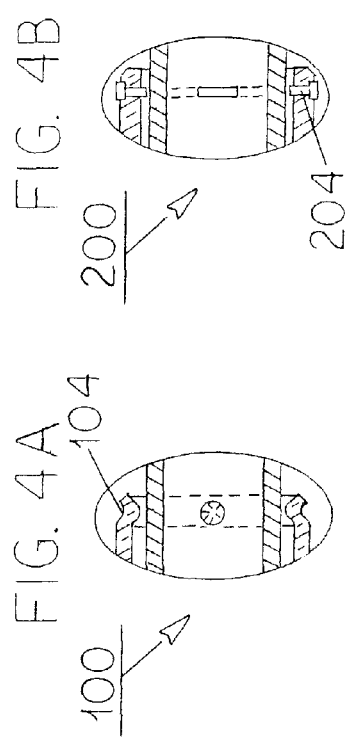

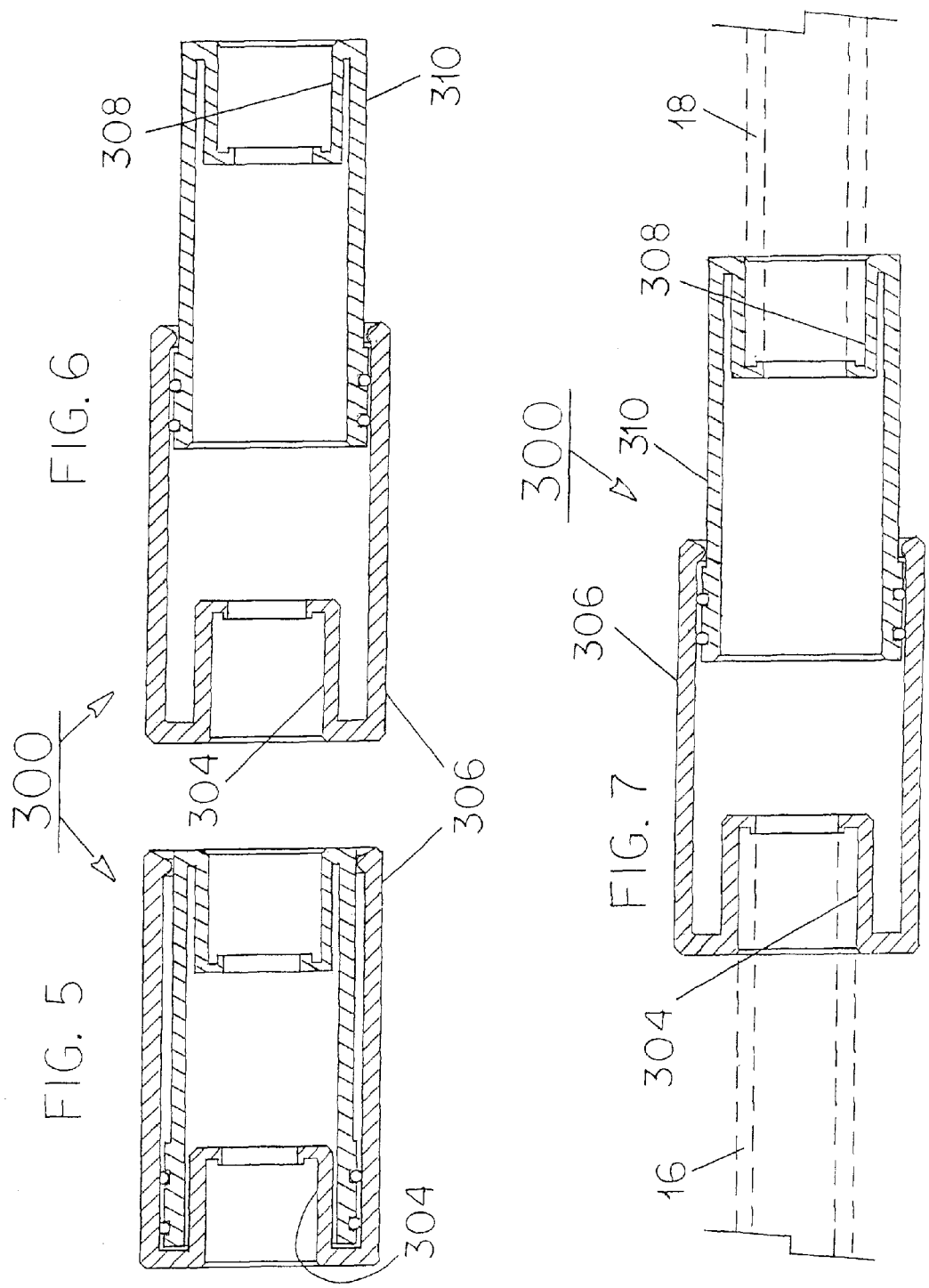

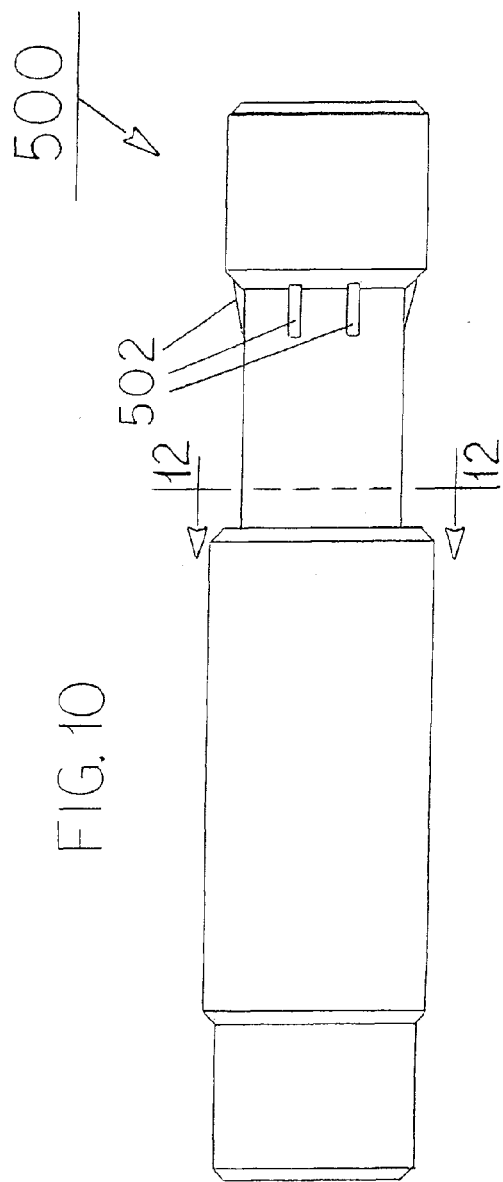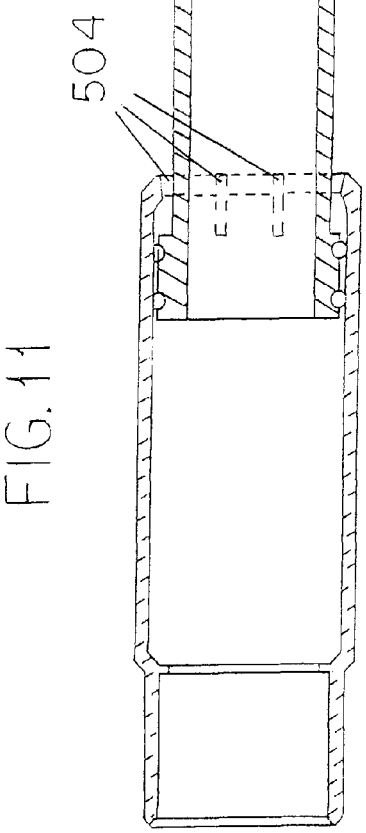

US 8,764,066 B1

EXPANSION COUPLING SYSTEM

BACKGROUND OF THE INVENTION

1. Field of the Invention

The present invention relates to an expansion coupling system and more particularly pertains to contracting two pipe components prior to installing, extending the two pipe components between buried broken water lines, and attaching the two extended pipe components to the buried broken water lines, the contracting, extending and attaching being done in a safe, convenient and economical manner.

2. Summary of the Invention

In view of the disadvantages inherent in the known types of coupling systems of known designs and configurations now present in the prior art, the present invention provides an improved expansion coupling system. As such, the general purpose of the present invention, which will be described subsequently in greater detail, is to provide a new and improved expansion coupling system and method which has all the advantages of the prior art and none of the disadvantages.

To attain this, the present invention essentially comprises an expansion coupling system. A first component has a major section and a coaxial minor section. The major section has an open forward end. A forward annular projection extends radially inwardly from the major section adjacent to the open forward end. A second component has a major section and a coaxial minor section. The major section has an open rearward end. A rearward annular projection extends radially outwardly from the major section adjacent to the open rearward end. Axially spaced annular recesses are provided in the rearward annular projection with an O-ring in each annular recess. The O-rings are slidably received and in sliding contact with the major section of the first component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved expansion coupling system which has all of the advantages of the prior art coupling systems of known designs and configurations and none of the disadvantages.

It is another object of the present invention to provide a new and improved expansion coupling system which may be easily and efficiently manufactured and marketed.

It is further object of the present invention to provide a new and improved expansion coupling system which is of a durable and reliable constructions.

An even further object of the present invention is to provide a new and improved expansion coupling system which is susceptible of a low cost of manufacture with regard to both materials and labor, and which accordingly is then susceptible of low prices of sale to the consuming public, thereby making such expansion coupling system economically available to the buying public.

Lastly, it is an object of the present invention to provide an expansion coupling system for contracting two pipe components prior to installing, extending the two pipe components between buried broken water lines, and attaching the two extended pipe components to the buried broken water lines, the contracting, extending and attaching being done in a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of an expansion coupling system constructed in accordance with the principles of the present invention.

FIG. 2 is an enlarged front elevational view of the system taken at Circle 2 of FIG. 1.

FIG. 3 is an end elevational view of the system taken along line 3-3 of FIG. 2.

FIG. 4 is a cross sectional view of the system taken along line 4-4 of FIG. 3.

FIG. 4A is an enlarged cross sectional view of the system taken at Circle 4A of FIG. 4.

FIG. 4B is an enlarged cross sectional view of the system similar to FIG. 4A illustrating an alternate coupler.

FIG. 4C is an enlarged cross sectional view of the system taken at Circle 4C of FIG. 4.

FIGS. 5, 6 and 7 are cross sectional views similar to FIG. 4 but illustrating an alternate embodiment of the invention, FIG. 5 in the pre-use contracted orientation, FIG. 6 in the use extended orientation, FIG. 7 in use when coupled.

FIGS. 10 and 11 are a front elevational view and a cross sectional view of a final alternate embodiment of the invention.

FIG. 12 is a cross sectional view of the system taken along line 12-12 of FIG. 11.

The same reference numerals refer to the same parts throughout the various Figures.

DESCRIPTION OF THE PREFERRED EMBODIMENT

Figure 8:
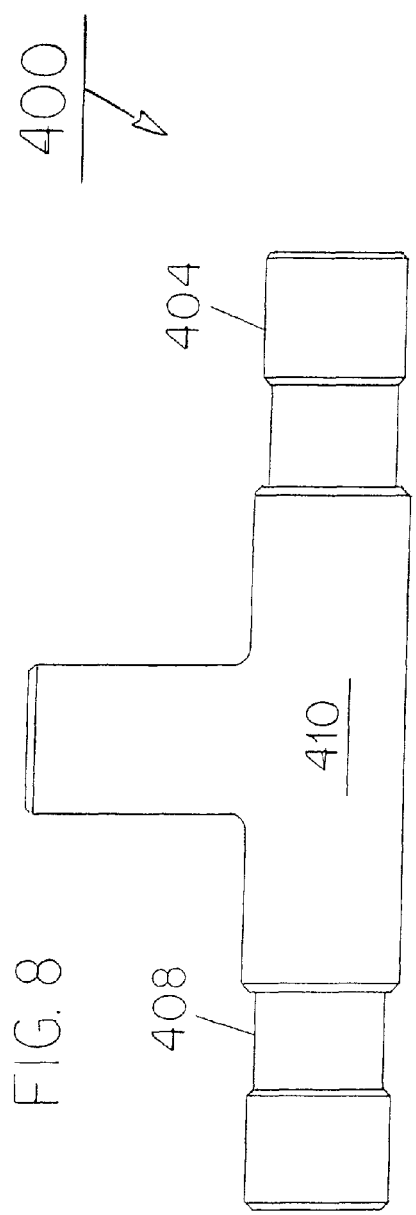
FIGS. 8 and 9 are a front elevational view and a cross sectional view of another alternate embodiment of the invention.

With reference now to the drawings, and in particular to FIG. 1 thereof, the preferred embodiment of the new and improved expansion coupling system embodying the principles and concepts of the present invention and generally designated by the reference numeral 10 will be described.

The present invention, the expansion coupling system 10 is comprised of a plurality of components. Such components in their broadest context include a first component and a second component. Such components are individually configured and correlated with respect to each other so as to attain the desired objective.

First provided is a buried broken water line 14. Note FIG. 1. The water line includes a broken first end 16. The water line includes an axially spaced broken second end 18. The water line is provided adjacent to the broken first and second ends. The water line has an outside diameter.

A coupling assembly 22 is provided. Note FIGS. 1, 2 and 4. The coupling assembly includes a first component 24. The first component has a major section 26. The major section is provided forwardly. The first component has an integrally formed minor section 28. The minor section is provided rearwardly. The major and minor sections of the first component are coaxial.

The major section of the first component has an interior diameter. The major section of the first component has an exterior diameter. The major section of the first component has an axial length. The major section of the first component has an open forward end 30. Note FIGS. 2 and 4.

A forward annular projection 36 is provided next. The forward annular projection extends radially inwardly from the major section of the first component adjacent to the open forward end. The forward annular projection has an interior diameter. The interior diameter of the forward annular projection is between 92 percent and 94 percent of the interior diameter of the major section of the first component. Note FIGS. 2 and 4.

The minor section of the first component has an interior diameter. The minor section of the first component has an exterior diameter. The minor section of the first component has an axial length. The minor section of the first component has an open rearward end 32. A forwardly facing annular rear abutment surface 34 is provided. The annular rear abutment surface is provided intermediate the major and minor sections of the first component. Note FIGS. 2 and 4.

Further provided is an annular stop ring 38. The annular stop ring is formed in the minor section of the first component adjacent to the major section of the first component. Note FIGS. 2, 3 and 4.

The coupling assembly includes a second component 44. The second component has a major section 42. The major section is provided rearwardly. The second component has an integrally formed minor section 46. The minor section is provided forwardly. The major and minor sections of the second component are coaxial. Note FIGS. 2 and 4.

The major section of the second component has an interior diameter. The major section of the second component has an exterior diameter. The major section of the second component has an axial length. The major section of the second component has an open rearward end 50. A rearward annular projection 52 is provided. The rearward annular projection extends radially outwardly from the major section of the second component adjacent to the rearward end. Note FIG. 4.

The rearward annular projection has an exterior diameter. The exterior diameter of the rearward annular projection is approximately between 89 percent and 91 percent of the interior diameter of the major section of the first component. The rearward annular projection has axially spaced annular recesses 54. Each annular recess has an O-ring 56. The rearward annular recesses and O-rings are slidably received in the major section of the first component. Axial movement is limited by the forward annular projection and the rearward abutment surface. Note FIGS. 2 and 4.

The minor section of the second component has an interior diameter. The minor section of the second component has an exterior diameter. The minor section of the second component has an axial length. The minor section of the second component has an open front end 58. A forward annular abutment surface 60 is provided. The forward annular abutment surface is provided intermediate the major and minor sections of the second component. Note FIGS. 2 and 4.

Provided last is a securement ring 64. The securement ring is provided at an axial intermediate location in the forward section of the second component. The securement ring has rearwardly angled metal teeth 66. The metal teeth are circumferentially spaced. The forward section of the second component has an annular forward recess 68. The recess is provided on each side of the securement ring. A forward O-ring 70 is provided in each forward recess. Note FIGS. 4 and 4C.

The second end of the broken water line is received and is either secured adhesively or mechanically by the teeth of the securement ring. Movement between the second end of the broken water line and the second component is limited by the forward annular abutment surface.

The first end of the broken water line is received and adhesively secured or mechanically secured by the teeth of the securement ring in the rearward end of the first component. Movement between the forward end of the broken water line and the first component is limited by the annular rear abutment surface. Note FIG. 1.

An alternate embodiment 100 of the present invention is provided. The major and minor sections of the first component are integrally formed. The major and minor sections of the second component are integrally formed. A front annular projection 104 is provided. Note FIG. 4A. The forward annular projection is formed as an annular bend in the major section of the first component. Note FIG. 4B.

Another alternate embodiment 200 of the present invention is provided. The major and minor sections of the first component are integrally formed. The major and minor sections of the second component are integrally formed. The forward annular projection is formed as a plurality of radially extending pins 204. The pins extend through the major section of the first component. Note FIG. 4C.

Another alternate embodiment 300 of the present invention is provided. In this embodiment, the first component has a minor section 304. The first component has a major section 306. The minor section of the first component is totally within the major section of the first component. The second component has a minor section 308. The second component has a major 310 section. The minor section of the second component is totally within the major section of the second component. Note FIGS. 5, 6 and 7.

Figure 9:
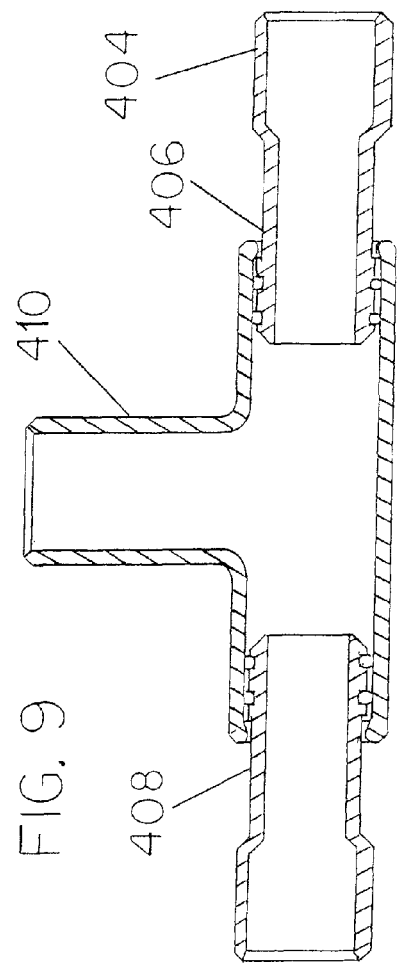

Another alternate embodiment 400 of the present invention is provided. The second component has a minor section 404. The second component has a major section 408. The minor section of the second component is integrally formed with the major section of the second component. The first component has a minor section 408. The first component has a major section 410. The minor section of the first component is fabricated separately from the major section of the first component. Note FIGS. 8 and 9.

In a final alternate embodiment 500 of the present invention, the second component has axial projections 502 intermediate the major and minor sections. The major section adjacent to the forward end is formed with radially interior axial slots 504. The slots are adapted to receive the axial projections when the first and second components are in a contracted orientation. Note FIGS. 10, 11 and 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An expansion coupling system comprising:
a first component having a major section and a coaxial minor section, the major section of the first component having an open forward end, a forward annular projection extending radially inwardly from the major section of the first component adjacent to the open forward end; and
a second component having a major section and a coaxial minor section, the second component formed with axial projections intermediate the major and minor sections, the major section of the second component having an open rearward end, a rearward annular projection extending radially outwardly from the major section of the second component adjacent to the open rearward end, axially spaced annular recesses in the rearward annular projection with an O-ring in each annular recess, the O-rings being slidably received and in sliding contact with the major section of the first component, the major section adjacent to the forward end formed with radially interior axial slots adapted to receive the axial projections when the first and second components are in a contracted orientation.

2. An expansion coupling system (10) for contracting two pipe components prior to installing, extending the two pipe components between buried broken water lines, and attaching the two extended pipe components to the buried broken water lines, the contracting, extending and attaching being done in a safe, convenient and economical manner, the system comprising, in combination:
a buried broken water line (14) including a broken first end (16) and an axially spaced broken second end (18), the water line adjacent to the broken first and second ends having an outside diameter;
a coupling assembly (22) including a first component (24), the first component having a major section (26) forwardly and an integrally formed minor section (28) rearwardly, the major and minor sections of the first component being coaxial;
the major section of the first component having an interior diameter and an exterior diameter and an axial length with an open forward end (30);
a forward annular projection (36) extending radially inwardly from the major section of the first component adjacent to the open forward end, the forward annular projection having an interior diameter between approximately 92 percent and 94 percent of the interior diameter of the major section of the first component;
the minor section of the first component having an interior diameter and an exterior diameter and an axial length with an open rearward end (32), a forwardly facing annular rear abutment surface (34) intermediate the major and minor sections of the first component;
an annular stop ring (38) formed in the minor section of the first component adjacent to the major section of the first component;
the coupling assembly (22) including a second component (42), the second component having a major section (44) rearwardly and an integrally formed minor section (46) forwardly, the major and minor sections of the second component being coaxial;
the major section of the second component having an interior diameter and an exterior diameter and an axial length with an open rearward end (50), a rearward annular projection (52) extending radially outwardly from the major section of the second component adjacent to the rearward end;
the rearward annular projection having an exterior diameter between approximately 89 percent and 91 percent of the interior diameter of the major section of the first component, axially spaced annular recesses (54) in the rearward annular projection with an O-ring (56) in each annular recess, the rearward annular recesses and O-rings being slidably received in the major section of the first component with axial movement limited by the forward annular projection and the rearward abutment surface;
the minor section of the second component having an interior diameter and an exterior diameter and an axial length with an open front end (58), a forward annular abutment surface (60) intermediate the major and minor sections of the second component; and
a securement ring (64) at an axial intermediate location in the minor section of the second component, the securement ring formed of circumferentially spaced, rearwardly angled metal teeth (66), an annular forward recess (68) in the minor section of the second component on each side of the securement ring with a forward O-ring (70) in each forward recess.

\* \* \* \* \*